Aug. 16, 1927.

A. F. BROTZ 1,639,022

AIR COOLED ENGINE

Filed Oct. 19, 1922

WITNESSES
M. E. Downey
C. L. Naal

INVENTOR
Anton Frank Brotz
By R. S. Caldwell
ATTORNEY

Patented Aug. 16, 1927.

1,639,022

UNITED STATES PATENT OFFICE.

ANTON FRANK BROTZ, OF KOHLER, WISCONSIN, ASSIGNOR TO KOHLER COMPANY, OF KOHLER, WISCONSIN, A CORPORATION OF WISCONSIN.

AIR-COOLED ENGINE.

Application filed October 19, 1922. Serial No. 595,647.

This invention has for its object to provide an air cooled gas engine particularly designed for use in independent electric lighting and power plants but capable of general uses and distinguished by reason of its having numerous low resistance air passageways intercepted by the cylinders and numerous other air passageways crossing the cylinder heads.

An important object of the invention is to facilitate the heat transference by making such air passageways short and of low resistance to the passage of air with each passageway serving only a small portion of the cylinder or cylinder head and formed by the cylinder walls and a casing and partitions integral therewith, thus avoiding joints of low conductivity and simplifying and condensing the structure, making it inexpensive to manufacture as well as more efficient in operation.

With the above and other objects in view the invention consists in the air cooled engine as herein claimed and all equivalents.

Referring to the accompanying drawings wherein is shown an exemplification of the invention, like characters of reference indicate the same parts in different views.

Figure 1:
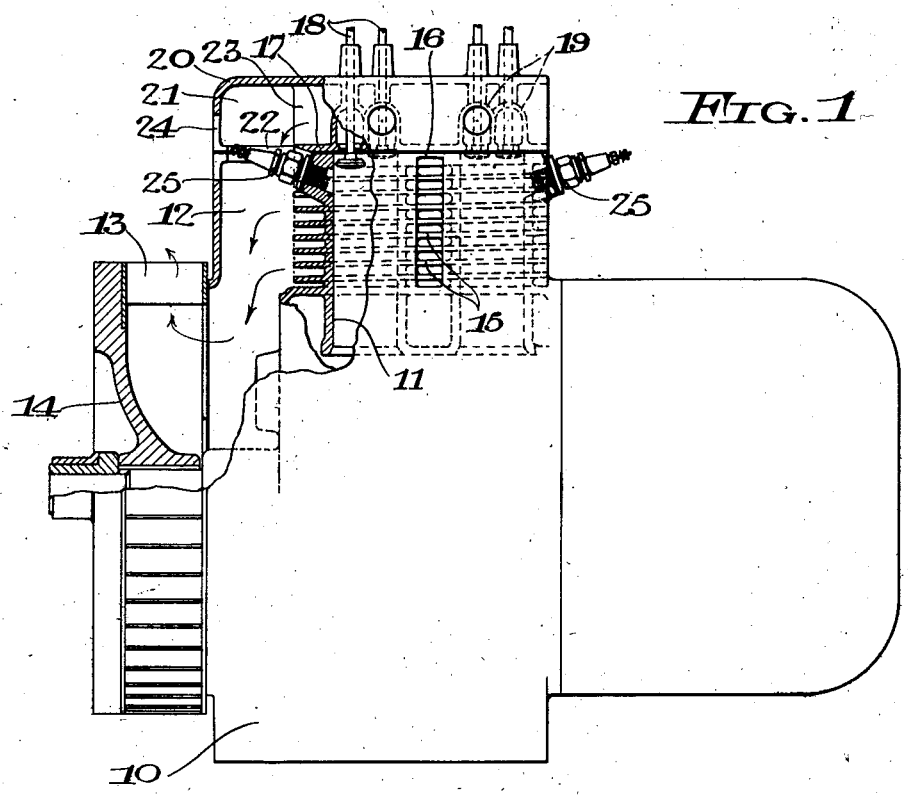
Figure 2:
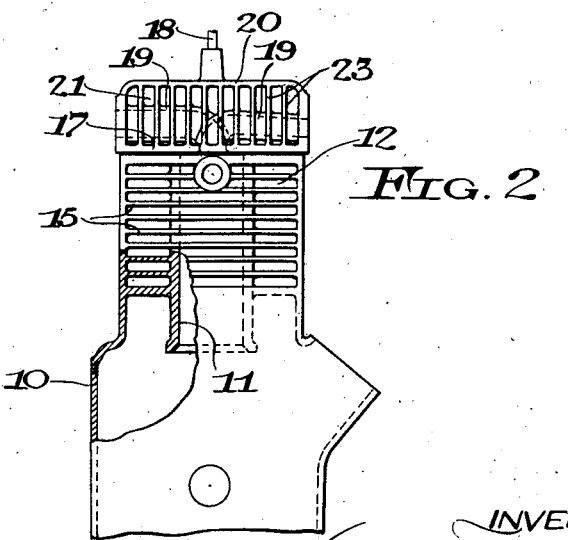

Fig. 1 is a side elevation partly in section of an air cooled gas engine constructed in accordance with this invention, and Fig. 2 is an end elevation thereof with parts sectioned.

In these drawings 10 indicates the engine casing which is in the form of a hollow shell having integrally cast therewith the cylinder walls 11, of which there are two shown but any number may be employed. This casing constitutes the crank case of the engine as usual but further continues as a housing surrounding the cylinders and spaced therefrom. This space between the cylinders and the side walls of the casing forms an air conduit 12 open at one end of the engine, as seen in Fig. 2, and bending downwardly as indicated by the arrows at the other end of the engine, as seen in Fig. 1 to communicate with a circular blower fan 13 incorporated with the engine fly-wheel 14 so that the radial discharge of air through said fan will draw air by suction through the conduit around the cylinder walls. Horizontal radiating ribs 15 extend across the air conduit 12, as best seen in Fig. 2, and these ribs are cast integral with the cylinder walls 11 and the casing wall 10. They extend from the air-receiving end of the conduit to the downwardly extending portion of the conduit and across openings 16 which are formed in the casing walls between the cylinders to admit cold air to the walls of the second cylinder.

A cylinder head 17 fits on top of the casing to close the cylinder ends and to contain the valves 18 and intake and exhaust manifolds 19, and this cylinder head is provided with a spaced casing 20 forming an air conduit 21 extending horizontally from one end of the engine to the other and communicating with the downwardly extending portion of air conduit 12 through an opening 22 formed by registering openings in the casing of the cylinder head and the engine casing. Thus the suction produced by the blower fan not only forcibly draws air through the conduit 12, but also through the conduit 21 to cool the cylinder head. The conduit 21 of the cylinder head block is provided with vertical heat radiating ribs 23 extending from the open end of the cylinder head block to the opening 22 and these ribs are cast integral with the walls of the cylinder head and its casing. A hand opening 24 may be provided at the junction of air passageways 21 and 12 to afford access to the spark plug 25 at that end of the engine, though provision may be made for closing such opening if desired.

In operation the blower fan draws air through the two horizontal air conduits around the cylinders and over the cylinder heads and these currents are divided by the numerous thin heat radiating ribs which are integral with the cylinder walls and cylinder head walls to readily conduct the heat therefrom so that the heat is quickly transferred to the air to thus keep the cylinders cool. The side opening 16 in the casing assures the second cylinder of fresh cold air in addition to the air that has been drawn past the first cylinder so that it may be cooled as well as the first cylinder.

The simplicity of the construction resulting from the formation of the air conduits and their division ribs or heat diffusing partitions as a part of the integral casting of the cylinders and the cylinder heads respectively, makes the invention inexpensive to manufacture and at the same time more efficient because of the absence of reliance on the low heat conductivity of contacting surfaces.

What I claim as new and desire to secure by Letters Patent is:

1. In an air cooled engine, a vertical cylinder casting, an integral casing forming a horizontal air conduit across which the cylinder extends, horizontal heat-conducting partitions extending across the air conduit and integral with the cylinder and casing and subdividing the air conduit into numerous similar air passageways each containing a portion of the cylinder wall, a removable cylinder head on the cylinder, a casing integral therewith forming a horizontal air conduit across the top of the cylinder head, vertical heat conducting partitions extending across the air conduit and integral with the cylinder head and casing and subdividing the air conduit into numerous similar air passageways each passing over a portion of the cylinder head, a chamber into which the air passageways of the cylinder and head discharge, and a blower fan communicating with an opening in said chamber.

2. In an air cooled engine, a vertical cylinder casting, an integral casing forming a horizontal air conduit across which the cylinder extends, horizontal heat conducting partitions extending across the air conduit and integral with the cylinder and casing and subdividing the air conduit into numerous similar air passageways each containing a portion of the cylinder wall, a removable cylinder head on the cylinder, a casing integral therewith forming a horizontal air conduit across the top of the cylinder head, vertical heat-conducting partitions extending across the air conduit and integral with the cylinder head and the casing and subdividing the air conduit into numerous similar air passageways, intake and exhaust manifolds for the cylinder head crossing the said air passageways, a chamber in the cylinder casing into which the air passageways of the cylinder casing discharge, a chamber in the cylinder head casing into which the air passageways of the cylinder head casing discharge, there being communicating openings connecting the two chambers, and a blower fan communicating with an opening in the cylinder casing chamber.

3. In an air cooled engine, a pair of cylinders, a casing forming an air conduit across which the cylinders extend, partitions extending longitudinally through the air conduit and laterally of the cylinders and subdividing the air conduit into numerous similar air passageways, and means for creating a current of air through the air conduit, said casing being provided with side openings for admitting air to the air passageways between the cylinders, said partitions extending across the side openings.

4. In a vertical cylinder gas engine, a removable cylinder head having formed integral therewith a horizontal air conduit crossing the cylinder head, a cylinder having formed integral therewith a horizontal air conduit crossed by the cylinder and having formed integral therewith a vertical chamber into which the air conduits of the cylinder and cylinder head discharge, and a blower fan communicating with the vertical chamber.

5. In a vertical cylinder gas engine, a removable cylinder head having formed integral therewith a horizontal air conduit crossing the cylinder head and containing vertical partitions integral with the top and bottom walls of the conduit, a cylinder having formed integral therewith a horizontal air conduit crossed by the cylinder and containing horizontal partitions integral with the opposite side walls of the conduit and with the walls of the cylinder, said cylinder having formed integral therewith a vertical chamber into which the air conduits of the cylinder and cylinder head discharge, and a blower fan communicating with the vertical chamber.

In testimony whereof, I affix my signature.

ANTON FRANK BROTZ.